United States Patent [19]

Hensel

[11] 4,102,717

[45] Jul. 25, 1978

[54] DIELECTRIC OPTICAL WAVEGUIDE COUPLINGS

[75] Inventor: Paul Christopher Hensel, Suffolk, England

[73] Assignee: The Post Office, London, England

[21] Appl. No.: 737,907

[22] Filed: Nov. 2, 1976

[30] Foreign Application Priority Data

Nov. 5, 1975 [GB] United Kingdom ............... 45965/75

[51] Int. Cl.² ............................................. G01B 19/34
[52] U.S. Cl. ...................................... 156/64; 156/158;
156/296; 156/378; 156/379; 156/433; 156/502;
264/1
[58] Field of Search ................. 156/64, 158, 296, 433,
156/378, 379, 502; 264/1.2

[56] References Cited

U.S. PATENT DOCUMENTS

| 3,810,802 | 5/1974 | Buhite et al. | 156/502 |
| 3,888,718 | 6/1975 | Arnaudin et al. | 156/379 |
| 3,912,574 | 10/1975 | Cherin et al. | 156/158 |
| 3,919,037 | 11/1975 | Miller | 156/502 |
| 3,928,102 | 12/1975 | Rowe et al. | 156/158 |

Primary Examiner—Edward G. Whitby
Attorney, Agent, or Firm—Kemon & Estabrook

[57] ABSTRACT

A method of making an optical coupling between a first dielectric optical waveguide and a second dielectric optical waveguide comprising, launching light into one of said first or second dielectric optical waveguides, moving an end of said first dielectric optical waveguide towards an end of said second dielectric optical waveguide, observing light radiated from the end of said first dielectric optical waveguide, and when said radiated light reaches a minimum value, fixing said first dielectric optical waveguide relative to said second dielectric optical waveguide to form a permanent coupling.

21 Claims, 7 Drawing Figures

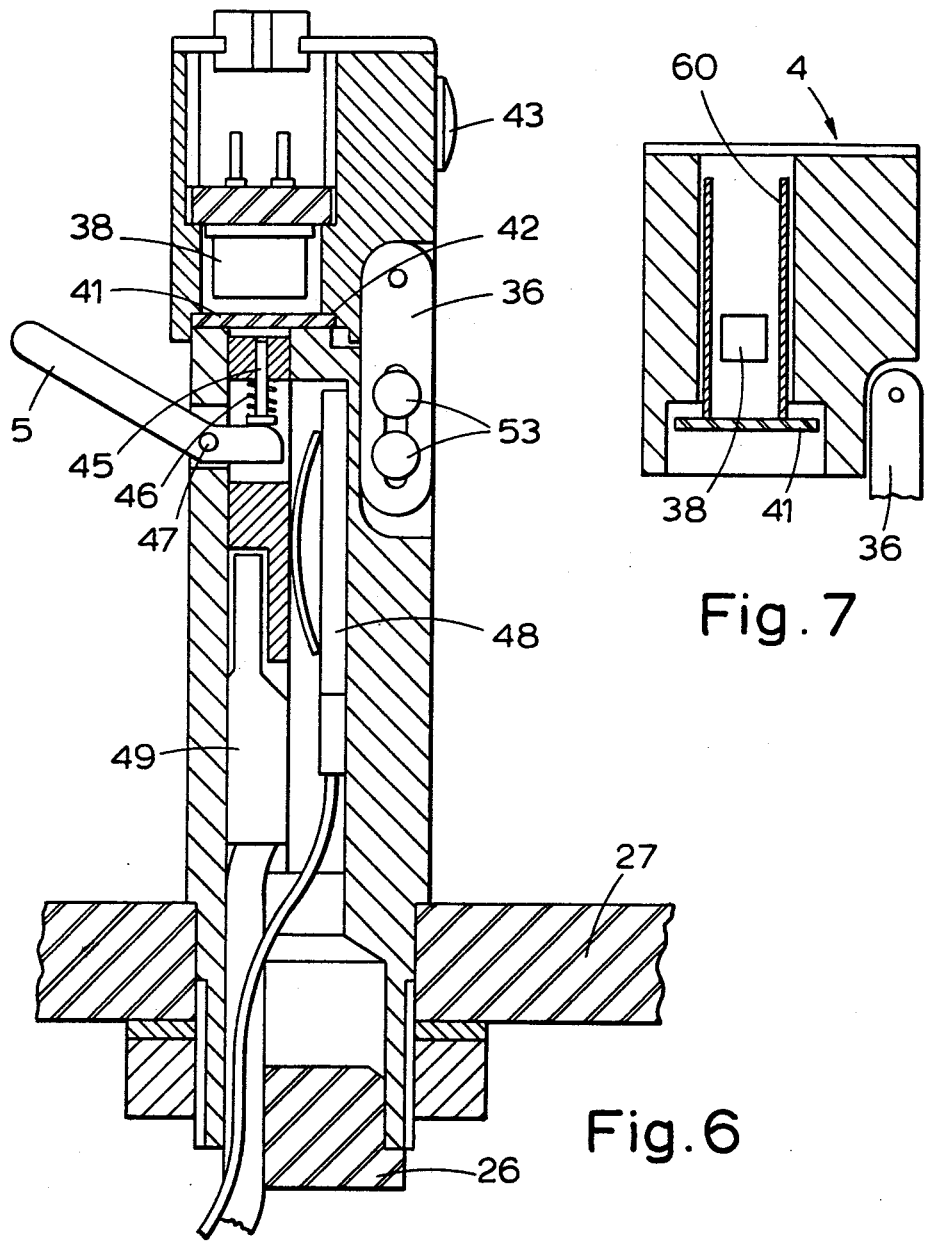

DIELECTRIC OPTICAL WAVEGUIDE COUPLINGS

The present invention relates to a machine for forming optical couplings between two dielectric optical waveguides, and a method of forming such couplings.

When dielectric optical waveguides are to be joined together, it is important to have a technique and equipment which can be successfully used in field conditions. The present invention seeks to provide such a technique and also to provide a coupling machine which is of simple construction and is easily used by a technician with a minimum of prior training. The type of couplings with which the present invention is particularly concerned are those in which two dielectric optical waveguides to be joined are pressed into a groove in a plate, and slid together until the ends abut, or nearly abut, and the joint is then finished by fixing a cover plate on top of the grooved plate using an epoxy resin or some similar material. It should be noted however that the present invention is not confined to this type of joint.

The principal problem in forming couplings between dielectric optical waveguides is positioning the ends of the dielectric optical waveguide so that they align and are close to each other. In particular it is necessary to be able to monitor any movement of the dielectric optical waveguide in order to determine whether they are in a position in which efficient optical coupling between two dielectric optical waveguides can occur. The present invention is particularly concerned with a technique for determining when the two dielectric optical waveguides to be coupled are in such a position.

Previous methods of determining when two dielectric optical waveguides are correctly aligned have involved launching light into one of the dielectric optical waveguides and monitoring the light output from the other dielectric optical waveguide. In a field situation this can be a difficult technique to use since it involves launching light from a remote end of the cable and collecting the light at the far end of the cable. Both the launching and detecting ends are remote in geographical location from the region where the jointing operation is being performed. The present invention involves launching light into one of the dielectric optical waveguides and monitoring the light emitted from the region in which the joint is being formed. Initially when the dielectric optical waveguides are well out of correct alignment the majority of the light launched into the far end of the dielectric optical waveguide is radiated at the joint. As the two dielectric optical waveguides to be coupled are brought closer to the correct alignment less and less of the light is radiated from the vicinity of the joint, since most of the light is now being coupled into the second dielectric optical waveguide. When correct alignment is attained the light radiated from the joint is a minimum. It is thus possible to determine correct alignment of the two dielectric optical waveguides to be joined by monitoring the light emitted from the region of the joint.

According to a first aspect of the present invention there is provided a method of making an optical coupling between a first dielectric optical waveguide and a second dielectric optical waveguide comprising, launching light into one of said first or second dielectric optical waveguide, moving an end of said first dielectric optical waveguide towards an end of said second dielectric optical waveguide, observing light radiated from the end of said first dielectric optical waveguide, and when said radiated light reaches a minimum value, fixing said first dielectric optical waveguide relative to said second dielectric optical waveguide to form a permanent coupling.

According to a second aspect of the present invention there is provided a machine for implementing the method of the previous paragraph including an assembly capable of moving an end of a first dielectric optical waveguide towards an end of a second dielectric optical waveguide, and an optical sensor for monitoring the light emitted from the end of said second dielectric optical waveguide.

According to a third aspect of the present invention there is provided a method of making an optical coupling between two dielectric optical waveguides of the type in which the two dielectric optical waveguides are aligned in a grooved plate and retained in said grooved plate, said method comprising the steps of:

a. locating an end of a first dielectric optical waveguide, and an end of a second dielectric optical waveguide in a groove in a grooved plate, b. launching light into one of said first or second dielectric optical waveguides so that light escapes from an end of said one dielectric optical waveguide, c. sliding said first dielectric optical waveguide longitudinally in said groove towards said second dielectric optical waveguide until said light that escapes is observed to have minimum intensity, and, d. fixing said first and second dielectric optical waveguides to said grooved plate in such a manner that said ends of said first and second dielectric optical waveguides are rigidly held in position relative to each other.

Preferably said first and second dielectric optical waveguides are fixed to said grooved plate by a cover plate which is fixed to said grooved plate by a thermosetting adhesive, said method including the step of heating said dielectric optical waveguides, grooved plate, cover plate and adhesive. Said light that escapes may be detected by a photodiode. Said ends of said first and second dielectric optical waveguides may be located in said groove by positioning said first dielectric optical waveguide in a groove on a first inclined ramp and positioning an end of said second dielectric optical waveguide in a groove on a second inclined ramp opposed to said first inclined ramp the ends of said first and second dielectric optical waveguides extending beyond said first and second inclined ramps and overlying said grooved plate which is located between said first and second inclined ramps, and moving said grooved plate until said ends of said first and second dielectric optical waveguides engage said groove in said grooved plate. Said first dielectric optical waveguide may be slid by moving said first inclined ramp.

According to a fourth aspect of the present invention there is provided a dielectric optical waveguide coupling machine capable of forming an optical coupling between two dielectric optical waveguides of the type in which the two dielectric optical waveguides are aligned in a grooved plate and retained in said grooved plate, said dielectric optical waveguide coupling machine comprising an assembly capable of locating an end of a first dielectric optical waveguide, and an end of a second dielectric optical waveguide in a groove in a grooved plate, mounted on a plate support means; an optical sensor located so as to monitor light in the vicinity of said plate support means; and a drive mechanism acting on said assembly, capable of moving the end of said first dielectric optical waveguide towards the end of said second dielectric optical waveguide.

Said assembly may include a pair of grooved ramps. Said optical sensor may be a photodiode. Said drive mechanism may comprise a differential screw acting on one of said grooved ramps. Said plate supporting means may have a heating means associated with it.

According to a fifth aspect of the present invention there is provided a dielectric optical waveguide coupling machine capable of forming an optical coupling between two dielectric optical waveguides of the type in which two dielectric optical waveguides are aligned in a grooved plate and retained in said grooved plate, said dielectric optical waveguide coupling machine comprising: first and second inclined ramps having mutually opposed slopes, each inclined ramp having a groove formed on a surface thereof, a grooved plate support capable of positively locating a grooves plate, located midway between said first and second inclined ramps, and arranged so that said grooves on said first and second inclined ramps lie in a plane which passes through a groove on a grooved plate when such a plate is located on said grooved plate support, a mechanism capable of moving said grooved plate support parallel to said plane, a mechanism capable of moving said first inclined ramp towards said second inclined ramp, and a light path from the vicinity of said grooved plate support to a light monitoring point.

An embodiment of the invention will now be described by way of example with reference to the drawings, in which:

FIG. 6 shows a section through the central column of the machine shown in FIG. 2 along line cc of FIG. 2.

FIG. 7 shows a modification, in section, of the photodiode housing 4 in FIG. 6.

Figure 1:
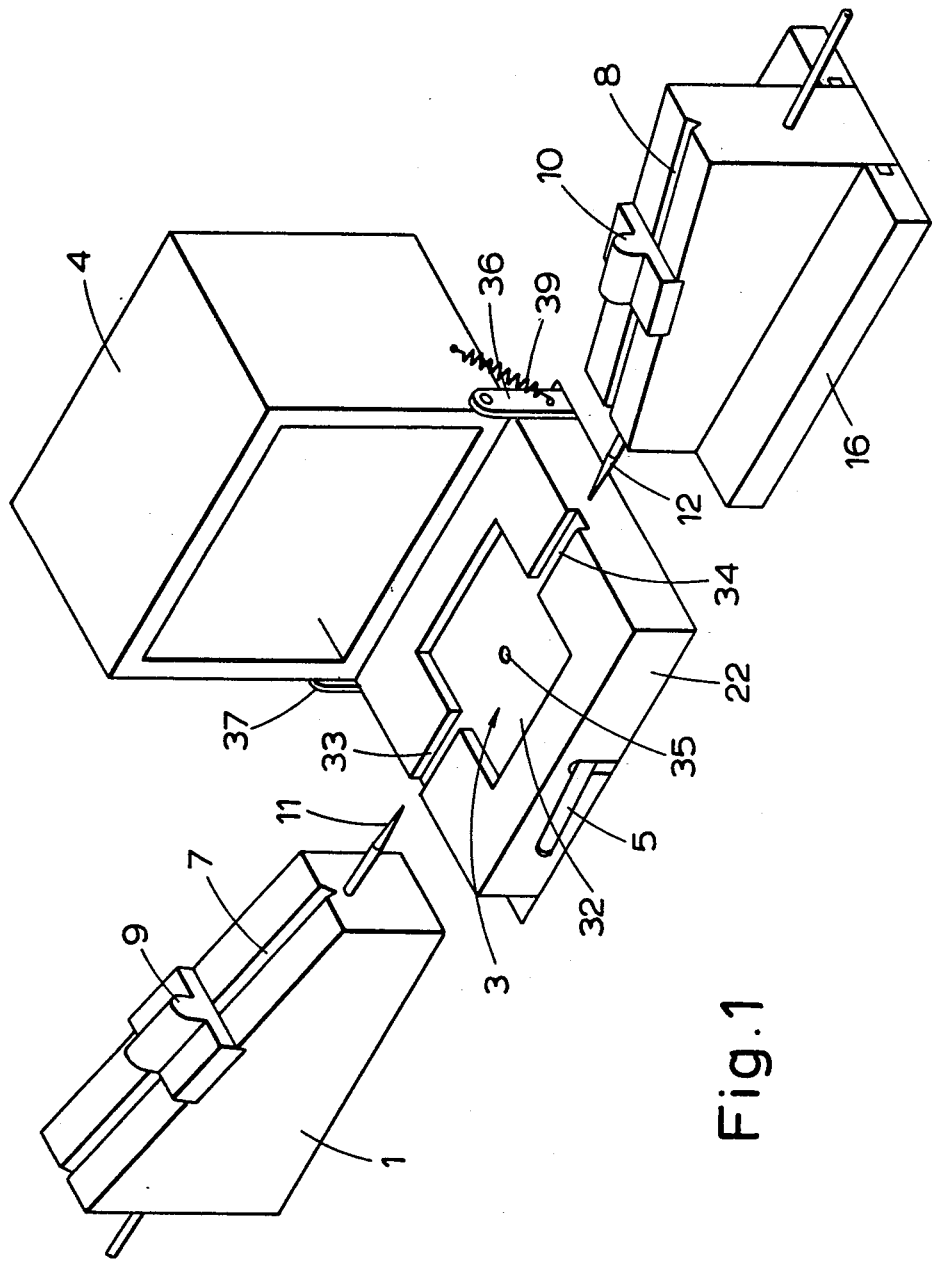
FIG. 1 shows a perspective view of the top surface of the jointing machine according to the invention.
Figure 2:
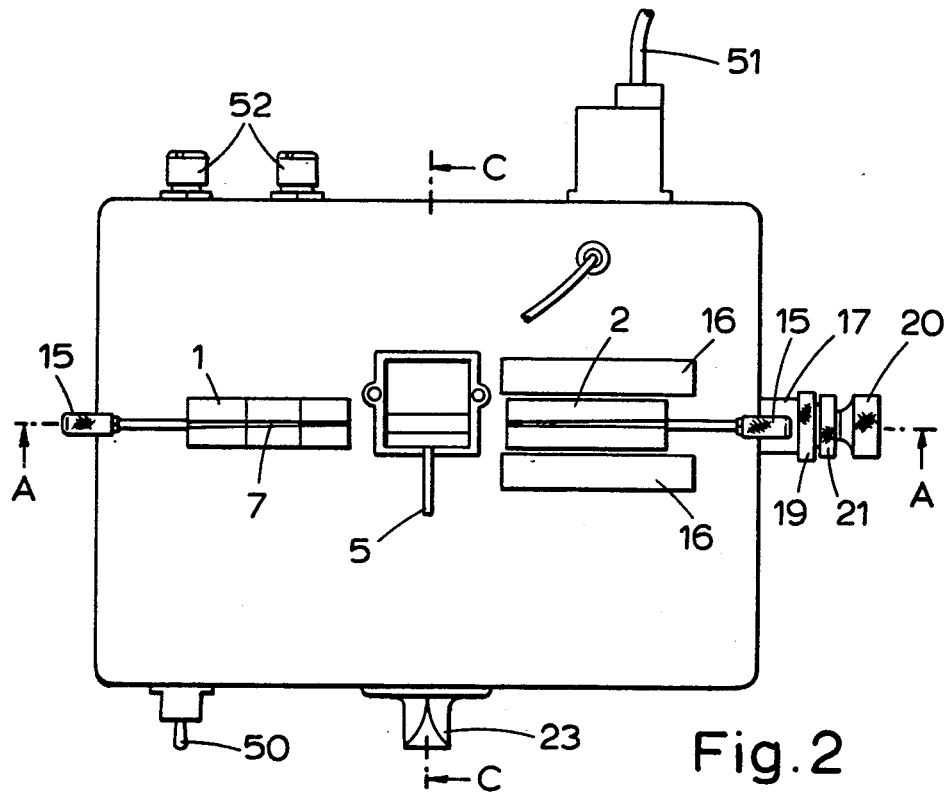
FIG. 2 shows a plan view of a dielectric optical waveguide coupling machine according to the invention.
Figure 3:
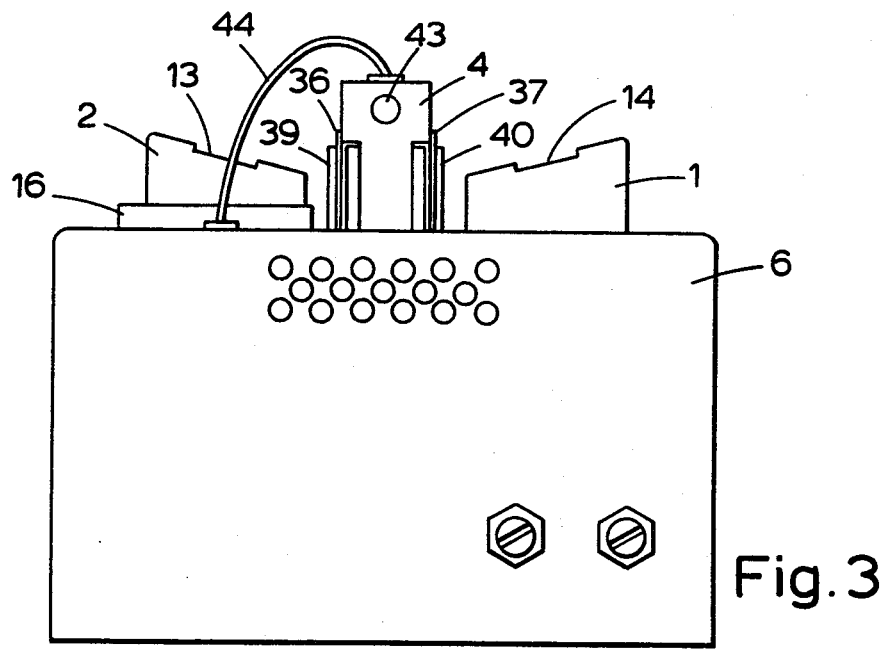
FIG. 3 shows a rear elevation of a dielectric optical waveguide coupling machine according to the invention.
Figure 4:
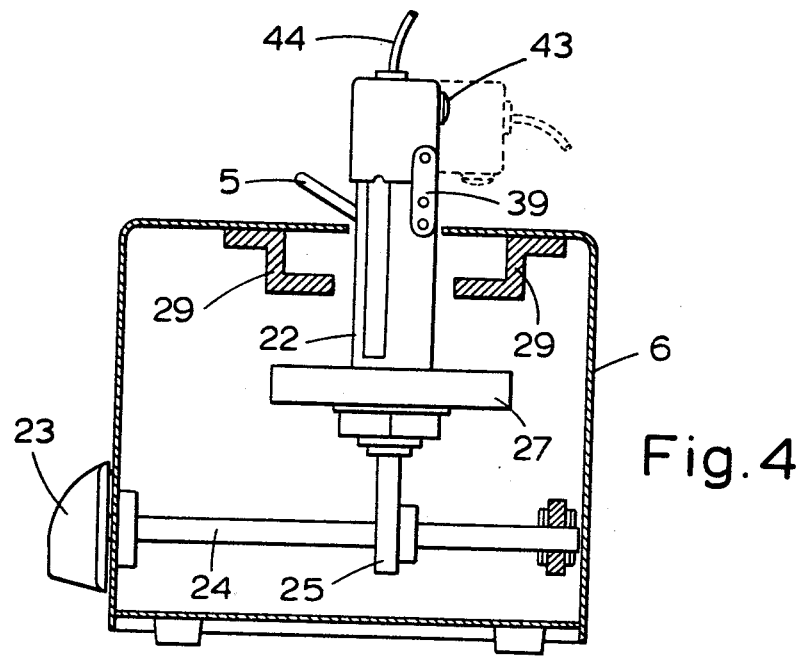
FIG. 4 shows a section through line cc of FIG. 2.

The present invention is concerned with a method of and a machine for coupling two dielectric optical waveguides together optically. In particular it is concerned with joints of the type in which the two dielectric optical waveguides to be coupled are positioned in a groove on a grooved plate and retained in position by a cover plate attached to the grooved plate by for example epoxy resin. A machine for making couplings of this type must include means for retaining the dielectric optical waveguides to be coupled in a groove on a grooved plate, some means for sliding the dielectric optical waveguides towards each other, a device for indicating when the dielectric optical waveguides are in a position where they form an efficient coupling, and some means for rigidly attaching the dielectric optical waveguides to the grooved plate. In the present invention the dielectric optical waveguides are located in the grooved plate by means of a pair of inclined ramp assemblies 1 and 2 in FIG. 1. The grooved plate in which the dielectric optical waveguides are to be located is retained in a grooved plate support 3, the condition of the joint is monitored by means of a photodiode contained in a housing 4, one dielectric optical waveguide can be moved towards the other by moving the ramp assembly 2 with the aid of a differential screw. The grooved plate support 3 can be heated by means of a heater, and a completed coupling can be ejected by means of an ejector operated by lever 5. Details of the individual components of the machine will now be described with reference to the drawings.

The inclined ramps 1 and 2 shown in FIG. 1 are mounted on a casing 6 which is shown in FIGS. 2, 3, 4 and 5. Both these inclined ramps have grooves 7 and 8 cut in their upper surfaces. These grooves are intended to carry and locate dielectric optical waveguides. The dielectric optical waveguides are retained in the grooves by means of magnetic pads 9 and 10. These pads are made of rubber loaded with a magnetic material so that they have a deformable surface. The magnetic pads 9 and 10 can be set in a recessed region of the surfaces 13 and 14 of the inclined ramps. This ensures that they make good contact with the dielectric optical waveguides to be held in the grooves 7 and 8. Each of the inclined ramps 1 and 2 is provided with a needle assembly 11 and 12 which can slide freely through a hole in the inclined ramps. These needles have finger grips 15 and 16, see FIG. 5. The needles are used in the preliminary positioning of dielectric optical waveguides in the grooves 7 and 8.

The inclined ramp 1 is rigidly attached to the machine casing 6, The inclined ramp 2, however, is movable towards the inclined ramp 1. This is achieved by means of a ball type linear bearing 16 mounted on the top surface of the casing 6. The ramp 2 is rigidly attached to a differential screw mechanism 17 by means of link work 18 and 19. The differential screw 17 enables the ramp 14 to be moved with a coarse adjustment and a fine adjustment by means of the knurled knobs 19 and 20. Knurled knob 21 is a locking nut.

Figure 5:
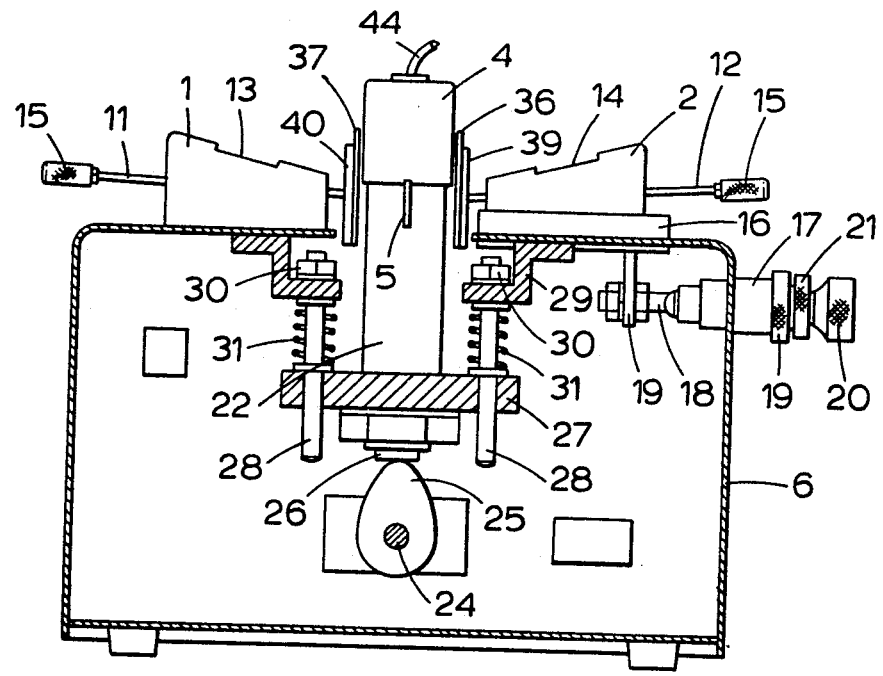
FIG. 5 shows a section through line aa of FIG. 2.

The central column 22 on which the grooved plate support 3 is located, can be moved up and down vertically by means of the knob 23 on the front panel of the instrument. This knob is connected to and rotates a shaft 24 to which a cam 25 is attached. The cam 25 bears on a PTFE surface 26 located at the bottom of the central column 22. The whole of the central column is mounted on a PTFE plate 27. This plate has three vertical rods 28, of which two are shown in FIG. 5, passing through it. These vertical rods 28 are mounted to the machine case 6 by means of flanges 29 and nuts 30. The column assembly is biased to the lowest position by means of springs 31 surrounding each of the column 28. It will thus be seen that rotation of knob 23 causes cam 25 to rotate, raising the platform 27 and the central column 22 against the actions of springs 31.

The central column is a complex structure. At its upper end, it has the grooved plate support, and also a photocell housing hinged to it. The grooved plate support consists of a rectangular depression 32, see FIG. 1, having a pair of rectangular grooves 33 and 34 connected to it.

In the centre of the rectangular depression 32 is a hole 35, through which an ejector pin can pass. The rectangular depression is intended to receive and locate the grooved plate in which dielectric optical waveguides to be coupled will be positioned. It should be noted that the groove in such a grooved plate will lie in a common vertical plane with the grooves 7 and 8 of the inclined ramps. A photodiode housing 4 is hinged by means of insulating hinges 36 and 37 to the top of the central column 22. These hinges are heat insulating to prevent the temperature of the photodiode rising to an excessive value, when the central column is heated. The photodiode 38, see FIG. 6 is mounted inside housing 4. Housing 4 has a pair of springs 39 and 40 which are mounted over centre so that the housing is held in the open position by spring biasing, and held closed against the grooved plate support by spring biasing. Beneath the photo-cell is mounted a glass window 41. This glass window is mounted on top of a spring washer, not shown in a groove 42 at the base of housing 4. This glass plate 41 acts as a pressure member passing a cover plate, which must be transparent, onto the grooved plate of a dielectric optical waveguide coupling when the device is in use. In addition this glass window provides an optical path from the vicinity of the grooved plate support to the photodiode 38. Finally it should be noted that the housing 4 is equipped with a rubber stop pad 43 and an electric connecting cable 44 is connected to the photodiode 38.

A modified version of housing 4 is shown in FIG. 7. In this modification, the glass window 41 is biased downwards by a brass tube 60, which is free to slide within housing 4.

Just beneath the grooved plate support 3 is mounted an ejector mechanism which consists of a pin 45 spring biased by a spring 46. This pin can be moved upwardly through hole 35, see FIG. 1, by means of lever 5 acting via pivot point 47 on the lower surface of pin 46. The central column 22 contains a 25 watt heating element 48 and a thermostatic control 49. The heater may be switched on by means of a switch 50 on the front panel of the casing 6. An electric supply is connected to the instrument by means of cable 51, and fuses 52 are mounted at the rear of the panel 6.

Before the machine is used for jointing it is necessary to ensure that the grooves 7 and 8 on the inclined ramps 1 and 2, see FIG. 1, lie in a common plane with each other and with the groove in the grooved plates to be used in the joints. This can be done by means of adjusting screws, not shown in the figures, used to attach inclined ramp 1 and linear bearing 16 to the top plate. Furthermore, the hinges 36 and 37 can be adjusted for height by means of adjusting screws 53. The pressure exerted by the glass plate 41 on a cover plate used in the dielectric optical waveguide coupling can be adjusted by adjusting the height of springs 39 and 40.

In operation the photodiode housing is initially in the open position as shown in FIG. 1. A grooved copper plate is positioned in the grooved plate support 3. The central column 22 is moved into the lower position by means of knob 23. The needles 11 and 12 are then positioned so that they are a millimeter or so apart over the grooved plate. The needles can be preset so that when pushed firmly to the centre they stop in the required positions. Dielectric optical waveguides are then placed in the grooves 7 and 8 and arranged so that their ends are aligned with the ends of the needles 11 and 12. When this has been done the dielectric optical waveguides are lightly clamped in position by means of the magnetic pads 9 and 10. The needles are then withdrawn and the central column is raised.

This causes the dielectric optical waveguides to spring into the groove in the grooved copper plate and be retained there by a spring action. It should be noted that this spring action is provided by deformation of the dielectric optical waveguides themselves. A blob of epoxy resin is then placed over the dielectric optical waveguides in the grooved plate and a transparent cover plate positioned over the top of them. The photodiode housing 4 is then hinged over the top of the cover plate, grooved plate and dielectric optical waveguide assembly, where it is retained by the action of springs 39 and 40. Light is then launghed into the end of one of the dielectric optical waveguides and an electric output obtained from the photodiode 38. The inclined ramp 2 is then moved towards inclined ramp 1 by means of the differential screw 17, until the photodiode output is a minimum. When this is achieved the dielectric optical waveguides are correctly aligned. The joint is then made permanent by switching on the heater which causes the epoxy resin to set. It should be noted that in the final joint the ends of the dielectric optical waveguides will not necessarily be in contact and the slight gap which may occur between the ends is filled with epoxy resin which will act as an index matching material.

The dielectric optical waveguide coupling tool as described so far is intended for use with a thermosetting adhesive. However a UV cured epoxy resin such as Nuva-Seal sold by L. D. Caulk Ltd may be used. A device for use with this type of adhesive would have the heater omitted and a small UV lamp substituted for it. UV light would be transmitted from the lamp to the region of joint by means of a suitable fibre optic light pipe.

The ends of the dielectric optical waveguides of course need to be properly prepared this can be done by the scratch and pull technique, using for example the device described in our co-pending application No. 29511/75. The temperature attained by the epoxy resin in the joint is about 100° C, and the epoxy resin cures at this temperature after a few minutes. The completed joint is ejected from the groove plate support by means of the ejector operated by lever 5, after the photodiode housing has been hinged back.

I claim:

1. A method of making an optical coupling between two dielectric optical waveguides of the type in which two dielectric optical waveguides are aligned in a grooved plate and retained in said grooved plate, said method comprising the steps of:
    (a) locating an end of a first dielectric optical waveguide, and an end of a second dielectric optical waveguide in a groove in a grooved plate,
    (b) Launching light into one of said first or second dielectric optical waveguides so that light escapes from an end of said one dielectric optical waveguide,
    (c) Sliding said first dielectric optical waveguide longitudinally in said groove towards said second dielectric optical waveguide until said light that escapes is observed to have minimum intensity, and
    (d) Fixing said first and second dielectric optical waveguides to said grooved plate in such a manner that said ends of said first and second dielectric optical waveguides are rigidly held in position relative to each other.

2. A method as claimed in claim 1 wherein said first and second dielectric optical waveguides are fixed to said grooved plate by a cover plate which is fixed to said grooved plate by a thermo-setting adhesive, said method including the step of heating said dielectric optical waveguides, grooved plate, cover plate and adhesive.

3. A method as claimed in claim 1 wherein said first and second dielectric optical waveguides are fixed to said grooved plate by a cover plate which is fixed to said grooved plate by an UV light cured adhesive, said method including the step of exposing said dielectric optical waveguides, grooved plate, cover plate and adhesive to UV light.

4. A method as claimed in claim 3 wherein said light that escapes may be detected by a photo diode.

5. A method as claimed in claim 4 wherein said ends of said first and second dielectric optical waveguides are located in said groove by positioning said first dielectric optical waveguide in a groove on a first inclined ramp and positioning an end of said second dielectric optical waveguide in a groove on a second inclined ramp opposed to said first inclined ramp, the ends of said first and second dielectric optical waveguides extending beyond said first and second inclined ramp and overlying said grooved plate which is located between said first and second inclined ramps, and moving said grooved plate until said ends of said first and second dielectric optical waveguides engage said groove in said grooved plate.

6. A method as claimed in claim 5 wherein said first dielectric optical waveguide is slid by moving said first inclined ramp.

7. A dielectric optical waveguide coupling machine capable of forming an optical coupling between two dielectric optical waveguides of the type in which the two dielectric optical waveguides are aligned in a grooved plate and retained in said grooved plate, said dielectric optical waveguide coupling machine comprising an assembly including a pair of grooved ramps capable of locating an end of a first dielectric optical waveguide, and an end of a second dielectric optical waveguide, in a groove in a grooved plate, mounted on a plate support means; a photodiode located so as to monitor light in the vicinity of said plate support means, and a drive mechanism acting on said assembly, capable of moving the end of said first dielectric optical waveguide towards the end of said second dielectric optical waveguide.

8. A dielectric optical waveguide coupling machine as claimed in claim 7 wherein said drive mechanism is a differential screw acting on one of said grooved ramps.

9. A dielectric optical waveguide coupling machine as claimed in claim 8, wherein said plate support means comprises a recessed plate located on the top of a column containing said heater, said column mounted to permit movement along an axis, a cam engaging a surface of said column, and biasing means biasing said column so that said surface engages said cam whereby rotation of said cam causes said column to move along said axis.

10. A dielectric optical waveguide coupling machine as claimed in claim 9 wherein said recessed plate has a hole formed in the base of said recess, and an ejector pin mounted within said hole and normally located below the base of said recess, and means for moving said ejector pin against a bias means so that said ejector pin protrudes through said hole, above the base of said recess.

11. A dielectric optical waveguide coupling machine as claimed in claim 10 wherein said photo-diode is mounted in a housing hinged to said column, and biased towards an open position and a closed position by a pair of over centre mounted springs.

12. A dielectric optical waveguide coupling machine as claimed in claim 11 wherein both said ramps have a needle mounted in a hole lying in a common vertical plane with said groove formed in said ramps.

13. A dielectric optical waveguide coupling machine as claimed in claim 12 wherein said plate supporting means is firmly coupled to a heating means.

14. A dielectric optical waveguide coupling machine as claimed in claim 12 including a UV lamp and means for transmitting UV light from said lamp to the vicinity of said plate supporting means.

15. A dielectric optical waveguide coupling machine capable of forming an optical coupling between two dielectric optical waveguides of the type in which two dielectric optical waveguides are aligned in a grooved plate and retained in said grooved plate, said dielectric optical waveguide coupling machine comprising:
first and second inclined ramps having mutually opposed slopes, each inclined ramp having a groove formed on a surface thereof, a grooved plate support capable of positively locating a grooved plate, located midway between said first and second inclined ramps, and arranged so that said grooves on said first and second incline ramps lie in a plane which passes through a groove on a grooved plate when such a plate is located on said grooved plate support, a mechanism capable of moving said grooved plate support parallel to said plane, a mechanism capable of moving said first inclined ramp towards said second inclined ramp, and a light path from the vicinity of said grooved plate support to a light monitoring point.

16. A dielectric optical waveguide coupling machine as claimed in claim 15 wherein said photodiode is located at said light monitoring point.

17. A dielectric optical waveguide coupling machine as claimed in claim 16 wherein at least one of the said inclined ramps is slideably mounted, and can be moved by a differential screw.

18. A dielectric optical waveguide coupling machine as claimed in claim 17 wherein said grooved plate support is firmly coupled to a heating means.

19. A dielectric optical waveguide coupling machine as claimed in claim 18 wherein said grooved plate support comprises a recessed plate located on the top of a column containing said heater, said column mounted to permit movement along an axis, a cam engaging a surface of said column, and biasing means biasing said column so that said surface engages said cam whereby rotation of said cam causes said column to move along said axis.

20. A dielectric optical waveguide coupling machine as claimed in claim 19 wherein said recessed plate has a hole formed in the base of said recess, and an injector pin mounted within said hole and normally located below the base of said recess, and means for moving said ejector pin against a bias means so that said ejector pin protrudes through said hole above the base of said recess.

21. A dielectric optical waveguide coupling machine as claimed in claim 20 wherein said photodiode is mounted in a housing hinged to said column, and biased towards an open position and a closed position by a pair of over center mounted springs.

* * * * *